United States Patent
Nitsan et al.

(10) Patent No.: US 10,257,312 B2
(45) Date of Patent: Apr. 9, 2019

(54) PERFORMANCE MONITOR BASED ON USER ENGAGEMENT

(71) Applicant: Hewlett Packard Enterprise Development LP, Houston, TX (US)

(72) Inventors: Amichai Nitsan, Yehud (IL); Haim Shuvali, Yehud (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 98 days.

(21) Appl. No.: 15/335,738

(22) Filed: Oct. 27, 2016

(65) Prior Publication Data

US 2018/0124205 A1    May 3, 2018

(51) Int. Cl.
| | |
|---|---|
| *G06F 15/173* | (2006.01) |
| *H04L 29/08* | (2006.01) |
| *H04L 12/26* | (2006.01) |
| *G06F 11/34* | (2006.01) |
| *G06F 16/957* | (2019.01) |
| *G06F 11/30* | (2006.01) |

(52) U.S. Cl.
CPC ........ *H04L 67/325* (2013.01); *G06F 11/3419* (2013.01); *G06F 16/957* (2019.01); *H04L 43/16* (2013.01); *G06F 11/302* (2013.01); *G06F 11/3409* (2013.01); *G06F 11/3438* (2013.01); *G06F 11/3466* (2013.01); *H04L 29/08675* (2013.01); *H04L 43/04* (2013.01); *H04L 43/08* (2013.01); *H04L 67/22* (2013.01)

(58) Field of Classification Search
CPC . H04L 29/08675; H04L 67/22; H04L 67/325; H04L 43/04; H04L 43/08; H04L 43/16; G06F 11/3438; G06F 11/302; G06F 11/3466; G06F 11/3409; G06F 11/3419

USPC ........................................ 709/224, 202, 203
See application file for complete search history.

(56) References Cited

U.S. PATENT DOCUMENTS

| | | | |
|---|---|---|---|
| 8,645,362 B1 | 2/2014 | Jain et al. | |
| 8,725,741 B2 | 5/2014 | Cohen et al. | |
| 8,875,167 B2 | 10/2014 | Stiers et al. | |
| 2003/0079160 A1 | 4/2003 | McGee et al. | |
| 2003/0130995 A1* | 7/2003 | Pope | G06F 17/30286 |
| 2005/0251792 A1* | 11/2005 | Smith | G06F 11/3419 717/131 |
| 2008/0133287 A1* | 6/2008 | Slattery | G06F 11/3419 705/32 |

(Continued)

FOREIGN PATENT DOCUMENTS

WO    WO-2015/183322 A1    12/2015

OTHER PUBLICATIONS

Chen, J.B. et al., Using End-user Latency to Manage Internet Infrastructure, (Research Paper), 2002, 13 Pgs.

(Continued)

*Primary Examiner* — Liang Che A Wang
*Assistant Examiner* — Johnny B Aguiar

(57) ABSTRACT

Examples disclosed herein involve measuring application performance based on user engagement of the application. In examples herein, an activation of an action item may be detected and a degree of user engagement of the application in response to the activation of the action item may be determined. A threshold time for acceptable performance of the action item is adjusted based on the degree of user engagement.

12 Claims, 6 Drawing Sheets

(56) References Cited

U.S. PATENT DOCUMENTS

| | | | | |
|---|---|---|---|---|
| 2009/0288144 | A1* | 11/2009 | Huber | G06Q 20/1235 |
| | | | | 726/3 |
| 2012/0144246 | A1* | 6/2012 | Dreyfoos | G06F 11/302 |
| | | | | 714/47.1 |
| 2012/0250516 | A1* | 10/2012 | Aggarwal | H04L 45/22 |
| | | | | 370/238 |
| 2013/0158950 | A1 | 6/2013 | Cohen et al. | |
| 2013/0205020 | A1* | 8/2013 | Broda | G06F 11/3495 |
| | | | | 709/224 |
| 2014/0325169 | A1* | 10/2014 | Iyigun | G06F 3/068 |
| | | | | 711/162 |
| 2014/0342717 | A1* | 11/2014 | Chen | H04W 4/027 |
| | | | | 455/418 |
| 2015/0067527 | A1* | 3/2015 | Gardner | G06F 3/0482 |
| | | | | 715/739 |
| 2015/0088955 | A1* | 3/2015 | Hendrick | G06F 17/3053 |
| | | | | 709/201 |
| 2015/0100887 | A1* | 4/2015 | Verkasalo | G06F 3/0482 |
| | | | | 715/735 |
| 2015/0326455 | A1* | 11/2015 | Hui | G06F 3/0481 |
| | | | | 715/736 |
| 2015/0331553 | A1* | 11/2015 | Shaffer | G06F 3/013 |
| | | | | 715/765 |
| 2016/0096109 | A1* | 4/2016 | Login | A63F 13/30 |
| | | | | 463/42 |
| 2017/0357721 | A1* | 12/2017 | Chernenkov | G06F 17/30864 |

OTHER PUBLICATIONS

PIWIK: Javascript Tracking Client, (Research Paper), Nov. 28, 2014, 20 Pgs.

AppDynamics, "Transaction Thresholds", unknown date, 3 pages. Retrieved from Internet on May 9, 2018. <https://docs.appdynamics.com/display/PRO42/Transaction+Thresholds#TransactionThresholds-StaticandDynamicThresholds>.

DynaTrace, "Thresholds for Operations dashboards", unknown date, 3 pages, retrieved from Internet on May 9, 2018. <https://www.dynatrace.com/support/doc/synthetic/portal/business/operations-dashboard/creating-or-editing-operations-dashboards/thresholds-for-operations-dashboards/>.

Extended European Search Report for EP Application No. 17192252.9-1231; dated Mar. 20, 2018; 8 pages.

NewRelic, "Define thresholds that trigger an alert", unknown date, 5 pages, retrieved from Internet on May 14, 2018. <https://docs.newrelic.com/docs/alerts/new-relic-alerts/defining-conditions/define-thresholds-trigger-alert>.

* cited by examiner

PERFORMANCE MONITOR BASED ON USER ENGAGEMENT

BACKGROUND

Applications on computing devices (e.g., personal computers, mobile devices (e.g., smartphones, table computers, etc.), or servers) employ action items that enable users to access or retrieve information and/or interact with the application. Performance monitoring tools may be used to determine whether the action items perform adequately to provide an acceptable user experience.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve measuring performance of an application or action items of an application item based on a degree of user engagement of the application. In examples herein, the degree of user engagement is measured in response to activation of an action item and performance of the action item of the application is determined to be acceptable or unacceptable based on the degree of user engagement. A threshold time, used to determine an acceptable or unacceptable performance of the action item, may be set and/or adjusted based on the degree of user engagement.

Application performance monitoring involves monitoring execution of applications in a computing environment. In many instances, applications or action items (e.g., user input items, such as buttons, clickables, mouse-overs, drop-down boxes, text boxes, etc.) may be monitored to determine whether the application achieved an acceptable performance (e.g., reached expectations) or did not achieve an acceptable performance (e.g., performed below expectations) in response to activation of action items of the action item. In previous techniques, static thresholds for execution times of transactions of the action items may be used. However, static thresholds may be inaccurate because certain action items may require more or less time for certain transactions and/or varying times for various parameters of transactions, which may result in inaccurate performance measuring. In a baseline threshold technique, these thresholds may be adjusted based on timing of the transaction. For example, if a transaction associated with an action item is frequently taking extended period of time to complete, the threshold for acceptable performance may be lengthened. However, in some examples, the transaction may frequently take extended periods of time for unacceptable reasons (e.g., due to an error or performance problem). Accordingly, examples herein address these issues with using static thresholds and baseline thresholds by adjusting thresholds for acceptable performance using an estimated degree of user engagement of the application in response to activation of an action item of the application.

Examples disclosed herein involve detecting an activation of an action item of an application and measuring a degree of user engagement of the application in response to the activation of the action item. The degree of user engagement may be used to adjust a threshold time for acceptable performance of the action item, such that when an execution time for a transaction of the action item satisfies the threshold time, the action item achieves an acceptable performance.

Figure 1:
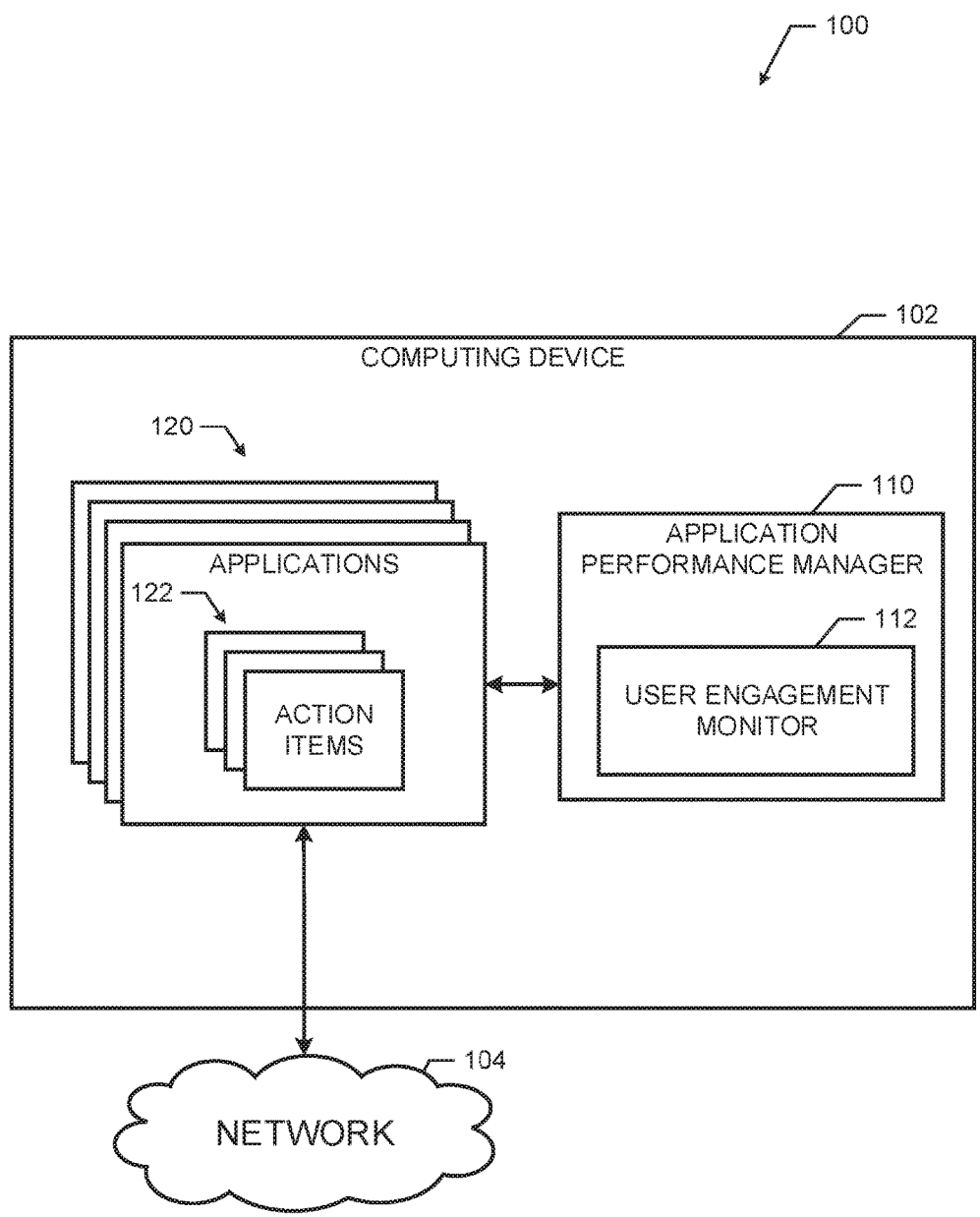
FIG. 1 is a block diagram of an example application performance monitoring system including a user engagement monitor implemented in accordance with an aspect of this disclosure.

FIG. 1 is a block diagram of an example application performance monitor system 100 including an application performance manager 110 with a user engagement monitor 112 constructed in accordance with examples herein. The example application performance monitor system 100 includes a computing device 102 in communication with a network 104. The example computing device 102 may be a personal computer, a mobile device (e.g., a smartphone, tablet computer, etc.), a server, or any other type of computing device. The example network 104 may be the World Wide Web (the Internet), an intranet, a local area network (LAN), a cloud network, etc. The computing device 102 of FIG. 1 includes the application performance manager 110 that monitors a plurality of applications 120 running or executing on the computing device 102 and reports on the performance of the applications 120 or action items 122 of the applications 120. The example applications 120 include a plurality of action items 122 (e.g., buttons, mouse clicks, selection boxes, text entries, scroll bars, etc.) that enable user interaction with the applications 120.

The example applications 120 may utilize the network 104 for storing, executing, and/or receiving/retrieving data for the applications 120. For example, the applications 120 may implement a search engine that enables the applications 120 to retrieve search results or data from the network 104. In examples herein, the application performance manager 110 manages and tracks performance of the applications 120. For example, the application performance manager 110 may generate and/or provide reports on the performance of the applications 120. In some examples, the application performance manager 120 may measure performance for action items 122 of the applications 120. For example, when one of the action items 122 of an application 120 is activated (e.g., via a user selection), the application performance manager 110 may determine whether the action item 122 achieved an acceptable performance. In examples herein, an action item 122 achieves an acceptable performance when the action item 122 performs a transaction of the application 120 within an expected amount of time (which may be referred to herein as a threshold time). An action item 122 may perform as expected when the transaction associated with the action item 122 is completed within a threshold time. The length of time to complete a transaction of an action item 122 may be referred to herein as execution time. In examples herein, the threshold time for acceptable performance is a length of time determined to be acceptable for an execution time of the action item 122 based on a degree of user engagement of the application 120 in response to executing the action item 122 measured by the user engagement monitor 112.

Accordingly, the user engagement monitor 112 may be used to set an acceptable threshold time for action items 122 of the applications 120 based on a degree of user engagement. The user engagement monitor 112 may thus use the degree of user engagement to automatically adjust a threshold for the action item 122 based on a measured degree of user engagement in response to the action item 122 being activated. In examples herein, the application performance manager 110 may then report when applications 120 and/or action items of the applications 120 achieved an acceptable performance or an unacceptable performance when the action items 122 are activated. The application performance manager 110 may report performance of the applications 120 or action items 122 of the applications 120 using output devices (e.g., displays, user interfaces, network interfaces, etc.) of the computing device 102. An example report may indicate acceptable or unacceptable performance of each activation or a set of activations of the action items 122 of the applications 120. In examples herein, the application performance monitor 120 may report any unacceptable performance in response to detection of an unacceptable performance or in response to a query (e.g., received via a user input).

Figure 2:
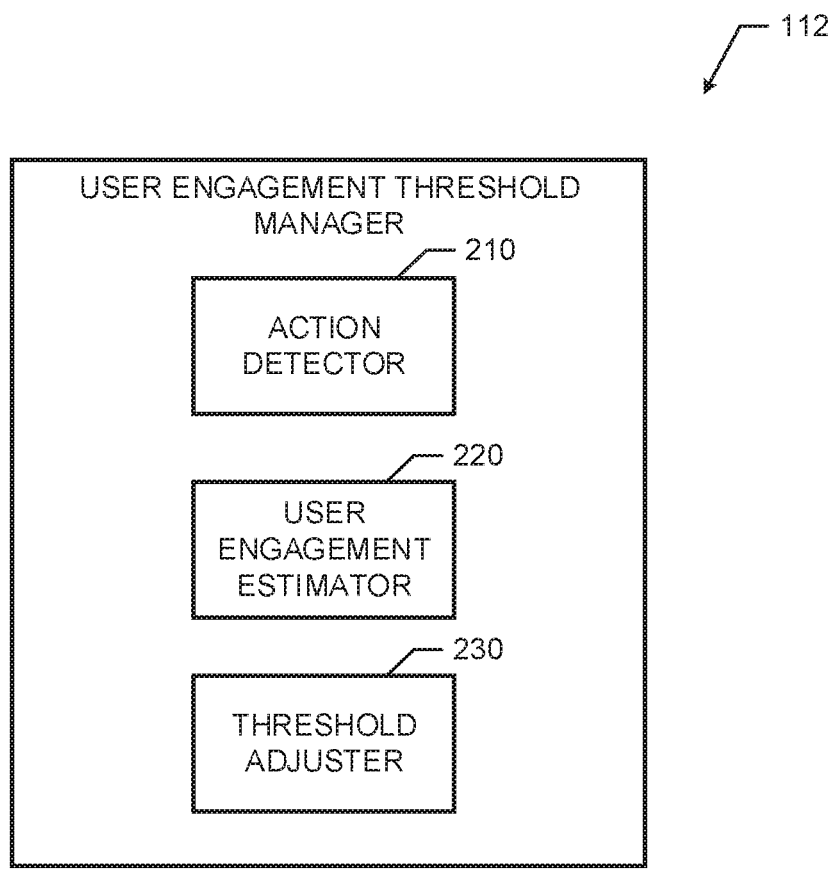
FIG. 2 is a block diagram of an example user engagement monitor that may be used to implement the user engagement monitor of FIG. 1.

FIG. 2 is a block diagram of an example user engagement monitor 112 that may be used to implement the user engagement monitor 112 of FIG. 1. The example user engagement monitor 112 of FIG. 2 includes an action detector 210, a user engagement estimator 220, and a threshold adjuster 230. In examples herein, the action detector 210 detects when an action item 122 of an application 120 executing on the computing device 102 is activated, the user engagement estimator 220 estimates a degree of user engagement of the application in response to the activation of the action item 122, and the threshold adjuster 230 adjusts a threshold time for the action item 122 based on the estimated degree of user engagement.

The example action detector 210 of FIG. 2 monitors the applications 120 and/or the action items 122 of the applications 120 to detect activation of the action items 122. Accordingly, the action detector 210 may determine when the applications 120 receive a user input (e.g., a mouse click, a button click, a mouse-over, a selection box, etc.) that activates the action items 122. The action detector 210 may detect activation of action items 122 based on running code of the applications and identifying initiated transactions. In some examples, the action detector 210 may determine which applications 120 are open and/or running on the computing device 102 and monitor input device(s) (e.g., a touchscreen, a mouse, a keyboard, a trackball, etc.) of the computing device 102 that are used to interact with the applications 120 by activating the action items 122. Upon detection of an activation of an action item 122, the example action detector 210 may instruct or notify the user engagement monitor 220 of the activation in order to measure a degree of user engagement of the application 120.

The example user engagement estimator 220 estimates a degree of user engagement of an application 120 in response to activation of an action item 122 of the application 120. The example degree of user engagement may be based on a user action time or an amount of data received/retrieved in response to activation of an action item. The degree of user engagement may be a score, a grade, or level that is based on a user action time or the amount of data received/retrieved in response to the activation of the action item 122. For example, a relatively higher degree of user engagement may be determined for longer user action times or relatively larger amounts of data received/retrieved for the application 120 in response to the activation of the action item 122. On the other hand, a relatively lower degree of user engagement may be determined for relatively shorter user action times or relatively smaller amounts of data received/retrieved for the application 120 in response to the activation of the action item 122.

In some examples, the user engagement estimator 220 estimates a degree of user engagement based on a user action time, which may be measured from the moment the action item 122 is activated to a moment when a subsequent action item 122 (either from the same application 120 or a different application 120) is activated. Based on the length of the user action time, the degree of user engagement with the application 120 can be inferred. For example, if an action item 122 is selected to provide search results for a query, a relatively long length of time between the selection of the action item 122 and a subsequent action item 122 indicates a longer or higher degree of user engagement versus a relatively short user action time indicating a shorter or lower degree of user engagement. Accordingly, the engagement estimator 220 may determine the length of the user action time from the action detector 210 to measure the user action time and infer the degree of user engagement.

In examples herein, the user engagement estimator 220 may use a timer and action notifications from the action detector 210 to measure the user action time. For example, upon detection of activation of a first action item 122 from the action detector 210, the user engagement estimator 220 may start the timer and wait to receive a subsequent notification of subsequent activation of a second action item 122. In examples herein, the first and second action items 122 may be the same action item (e.g., if the action item 122 is a search button, a first search may be performed via the action item 122 and a second search may be performed via the action item) or different action items 122. In some examples, the second action item 122 may be an action that closes an application 120 of the action item 122, an action that opens another application 120, an action that shutdowns, hibernates, screen locks, etc. a computing device 102 running the application 120, etc.

In some examples, the user engagement estimator 220 may measure the user action time based on detected actual user interaction with the application 120 (e.g. by detecting page scrolling of the application 120 or user browsing the application 120 (e.g., based on facial analysis, eye gaze indicating a user viewing or reading an application, etc.). In such examples, the user action time may begin when the user is determined to be interacting (e.g., viewing, reading, scrolling, etc.) with the application 120 and ends when the user stops interacting with the application 120.

Additionally or alternatively, the user engagement estimator 220 of FIG. 2 estimates a degree of user engagement for an action item based on an amount of data received/retrieved for an application 120 in response to activation of the action item 122. In examples herein, the data received/retrieved for the application 120 in response to activation of the action item 122 may be referred to as transaction data for the action item 122. For example, the user engagement estimator 220 may retrieve or access an amount of transaction data exchanged (e.g., uploaded/downloaded) to/from a network for the application 120 in response to the activation of the action item 122. Accordingly, the user engagement estimator 220 may interact with a network interface or data interface of the computing device 102 to determine an amount of data (e.g., transaction data or network data) exchanged for the application 120 in response to the action item 122 being activated. For example, the user engagement estimator 220 may determine an amount of data received/retrieved by the computing device 102 from the time the action detector 210 detects activation of an action item until completion of a transaction of the action item 122.

The user engagement estimator 220 may implement a data structured (e.g., a table, an index, a task graph, etc.) that maps degrees of user engagement to user action time and/or the amount of data received/retrieved in response to the activation of an action item 122. Accordingly, the user engagement estimator 220 may refer to the data structure to determine a degree of user engagement upon measuring the user action time and/or the amount of data for the action item 122. In some examples, there may be a data structure for all action items 122 or all types of action items 122 or different data structures specific to the action items 122 (e.g., based on type, application 120, etc.). In some examples, the user engagement monitor 112 may receive a selection (e.g., a user input) for measuring the degree of user engagement based on an amount of data retrieved for the application in response to the activation of the action item. The selection may indicate whether to measure user engagement based on the user action time, the amount of transaction data, or both the user action time and the amount of transaction data. In examples herein, when the user engagement estimator 220 estimates user engagement of an application 120 in response to activation of an action item 122 based on both user action time and an amount of transaction data of an action item, the user engagement estimator 220 may apply weights to the measurements to determine the degree of user engagement. For example, a greater weight may be given to the user action time versus the transaction data and vice versa. Additionally or alternatively, a three dimensional data structure (with user action time, transaction data, and threshold time) may be implemented to determine threshold time based on the user action time and the amount of transaction data.

The threshold adjuster 230 uses the degree of user engagement to determine a threshold time for acceptable performance of the action item 122. For example, when there is a short or low degree of user engagement, an acceptable performance for the action item 122 would involve a shorter threshold time to achieve an acceptable performance, while a longer or high degree of user engagement would involve a longer threshold time to achieve an acceptable performance. Accordingly, the threshold adjuster 230 may implement a data structure (e.g., a table, index, task graph, etc.) that maps appropriate threshold times for corresponding degrees of user engagement. In some examples, such data structures mapping degrees of user engagement to threshold times may be kept for each action item 122 of the applications 120. In some examples, a same data structure may be used for all action items 122 or applications 120 executed by the computing device 102.

In examples herein, the threshold time determined by the threshold adjuster 230 determines whether an action item 122 (when activated) achieved an acceptable performance. For example, if a length of time of a transaction of an action item 122 is greater than the threshold time, then the application performance manager 110 may determine that the action item did not achieve an acceptable performance, and when the length of time of the action item 122 satisfies the threshold time (e.g., is equal to or less than), then the application performance manager 110 may determine that the action item 122 did achieve an acceptable performance. Accordingly, the application performance manager 110 may report performance of action items 122 of the applications 120 based on user engagement using the user engagement monitor 112 of FIG. 2.

While an example manner of implementing the user engagement monitor 112 of FIG. 1 is illustrated in FIG. 2, at least one of the elements, processes and/or devices illustrated in FIG. 2 may be combined, divided, re-arranged, omitted, eliminated and/or implemented in any other way. Further, the action detector 210, the user engagement estimator 220, the threshold adjuster 230, and/or, more generally, the example user engagement monitor 112 of FIG. 2 may be implemented by hardware and/or any combination of hardware and executable instructions (e.g., software and/or firmware). Thus, for example, any of the action detector 210, the user engagement estimator 220, the threshold adjuster 230, and/or, more generally, the example user engagement monitor 112 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the action detector 210, the user engagement estimator 220, and/or the threshold adjuster 230 is/are hereby expressly defined to include a tangible machine readable storage device or storage disk such as a memory, a digital versatile disk (DVD), a compact disk (CD), a Blu-ray disk, etc. storing the executable instructions. Further still, the example user engagement monitor 112 of FIG. 2 may include at least one element, process, and/or device in addition to, or instead of, those illustrated in FIG. 2, and/or may include more than one of any or all of the illustrated elements, processes and devices.

Figure 3:
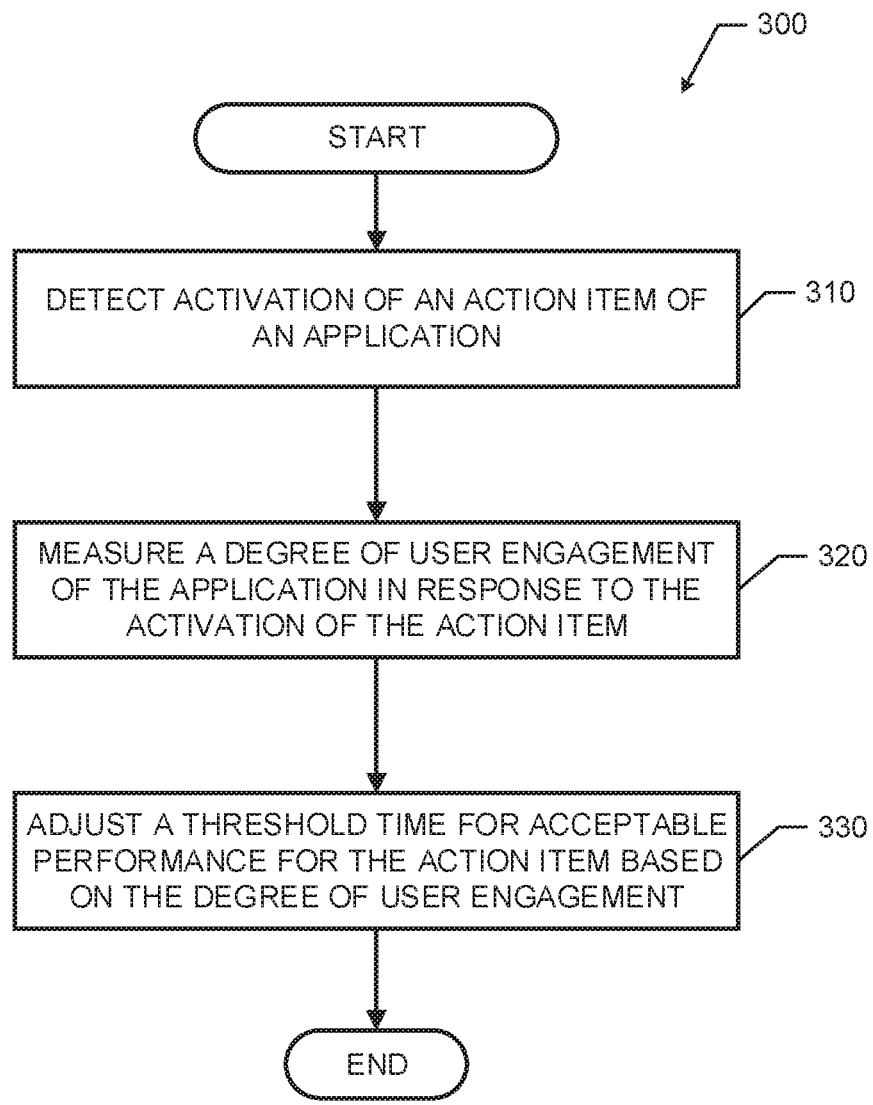
FIG. 3 is a flowchart representative of example machine readable instructions that may be executed to implement the user engagement monitor of FIG. 2.
Figure 4:
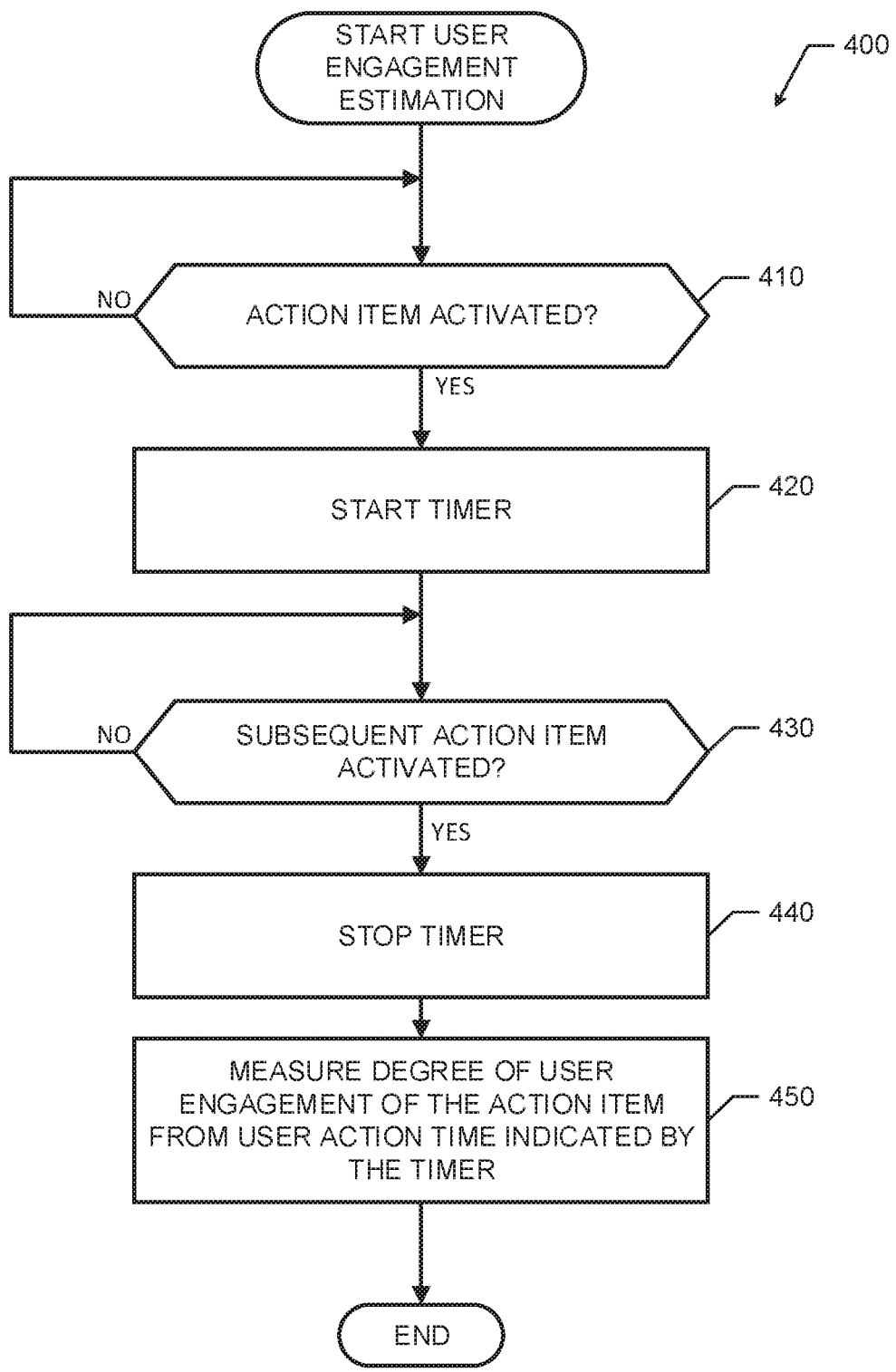
FIG. 4 is a flowchart representative of an example portion of the example machine readable instructions of FIG. 3 to implement the user engagement monitor of FIG. 2.
Figure 5:
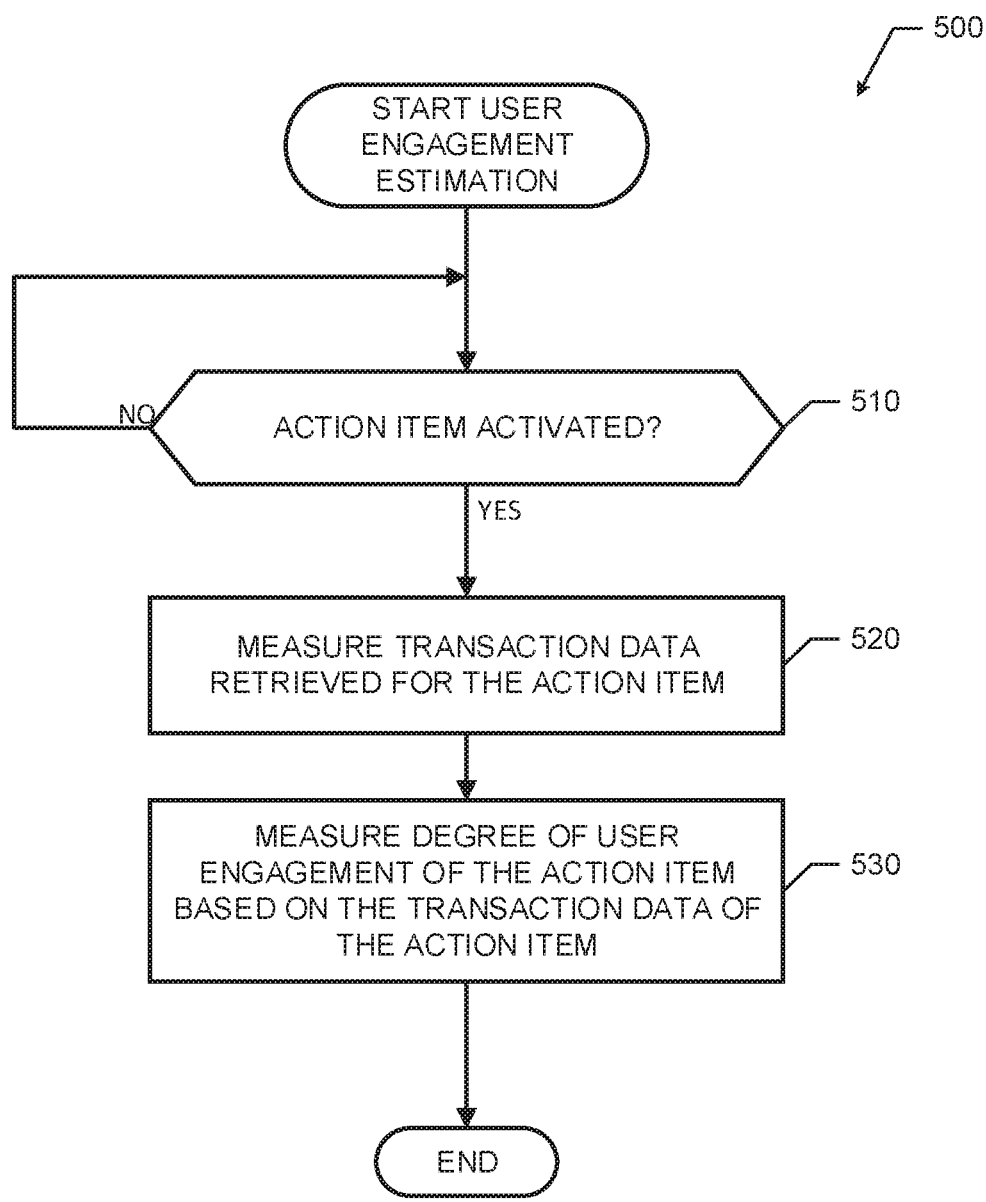
FIG. 5 is another flowchart representative of an example portion of the example machine readable instructions of FIG. 3 to implement the user engagement monitor of FIG. 2.

Flowcharts representative of example machine readable instructions for implementing the user engagement monitor 112 of FIG. 2 are shown in FIGS. 3, 4, and 5. In this example, the machine readable instructions comprise program(s)/process(es) for execution by a processor such as the processor 612 shown in the example processor platform 600 discussed below in connection with FIG. 6. The program(s)/process(es) may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 612, but the entirety of the program(s)/process(es) and/or parts thereof could be executed by a device other than the processor 612 and/or embodied in firmware or dedicated hardware. Further, although the example program(s)/process(es) is/are described with reference to the flowcharts illustrated in FIGS. 3, 4, and 5, many other methods of implementing the example user engagement monitor 112 may be used. For example, the order of execution of the blocks may be changed, and/or some of the blocks described may be changed, eliminated, or combined.

The example process 300 of FIG. 3 begins with an initiation of the user engagement monitor 112 (e.g., upon startup, upon instructions from a user, upon startup of a device implementing the user engagement monitor 112 (e.g., the application performance manager 110 of the computing device 102), etc.). The example process 300 of FIG. 3 may be executed to measure performance of an action item 122 of an application 120 based on a degree of user engagement.

At block 310, the action detector 210 detects activation of an action item 122 of an application 120. At block 320, the user engagement estimator 320 measures a degree of user engagement of the application 210 in response to the activation of the action item 122. For example, at block 320, the user engagement estimator 320 may estimate the degree of user engagement based on user action time and/or an amount of data received/retrieved for the application 120 in response to activation of the action item 122.

At block 330, the threshold adjuster 230 adjusts a threshold time for acceptable performance for the action item based on the degree of user engagement. After block 330, the example process 300 ends. In some examples, after block 330, the application performance manager 110 may report acceptable or unacceptable performance of an activation of an action item 122 when an execution time of the action item 122 satisfies the threshold time.

The example process 400 of FIG. 4 begins with an initiation of the user engagement estimator 220 (or the user engagement monitor 112). The example process 400 of FIG. 4 may be executed to implement the example block 320 of FIG. 3 to estimate/infer user engagement of an application 120 in response to activation of an action item 122 based on a user action time between the activation of the action item and an activation of a subsequent action item. At block 410, the user engagement estimator 220 determines whether an action item was activated (e.g., based on information from the action detector 110). If an action item 122 is not activated, control returns to block 410 (e.g., to wait for activation of an action item 122). If an action item 122 is activated at block 410, the user engagement estimator 220 starts a timer (block 420). At block 430, the user engagement estimator 220 determines whether a subsequent action item 122 is activated. The example subsequent action item 122 of block 430 may be the same action item of block 410, a different action item 122 than the action item 122 of block 410, or a user action that closes the application 120, opens another application 120, or changes power settings of the computing device 102. If a subsequent action item is not activated at block 430, control returns/waits at block 430. If a subsequent action item 122 is activated at block 430, then the user engagement estimator 220 stops the timer (block 440). At block 450, the user engagement monitor 112 measures the degree of user engagement from user action time of the action item 122 from user action time indicated by the timer. In some examples, a data structure mapping the degree of user engagement to user action time for the action item 122 may be used at block 450 to measure the degree of user engagement. After block 450, the example process 400 ends.

The example process 500 of FIG. 5 begins with an initiation of the user engagement estimator 220 (or the user engagement monitor 112). The example process 500 of FIG. 5 may be executed to implement the example block 320 of FIG. 3 to estimate/infer user engagement of an application 120 in response to activation of an action item 122 based on an amount of data received/retrieved for the application 120 in response to the activation of the action item 122. At block 510, the user engagement estimator 220 determines whether an action item was activated (e.g., based on information from the action detector 110). If an action item 122 is not activated, control returns to block 510 (e.g., to wait for activation of an action item 122). If an action item 122 is activated at block 450, then the user engagement estimator 220 measures transaction data for the action item (block 520). The example transaction data may be measured from an amount of data received/retrieved for the application 120 in response to the activation of the action item 122. At block 530, the user engagement estimator 220 measures a degree of user engagement of the action item 122 based on the transaction data for the action item 122. After block 530, the example process 500 ends.

As mentioned above, the example processes of FIGS. 3, 4, and/or 5 may be implemented using coded instructions (e.g., computer and/or machine readable instructions) stored on a non-transitory machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 3, 4, and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
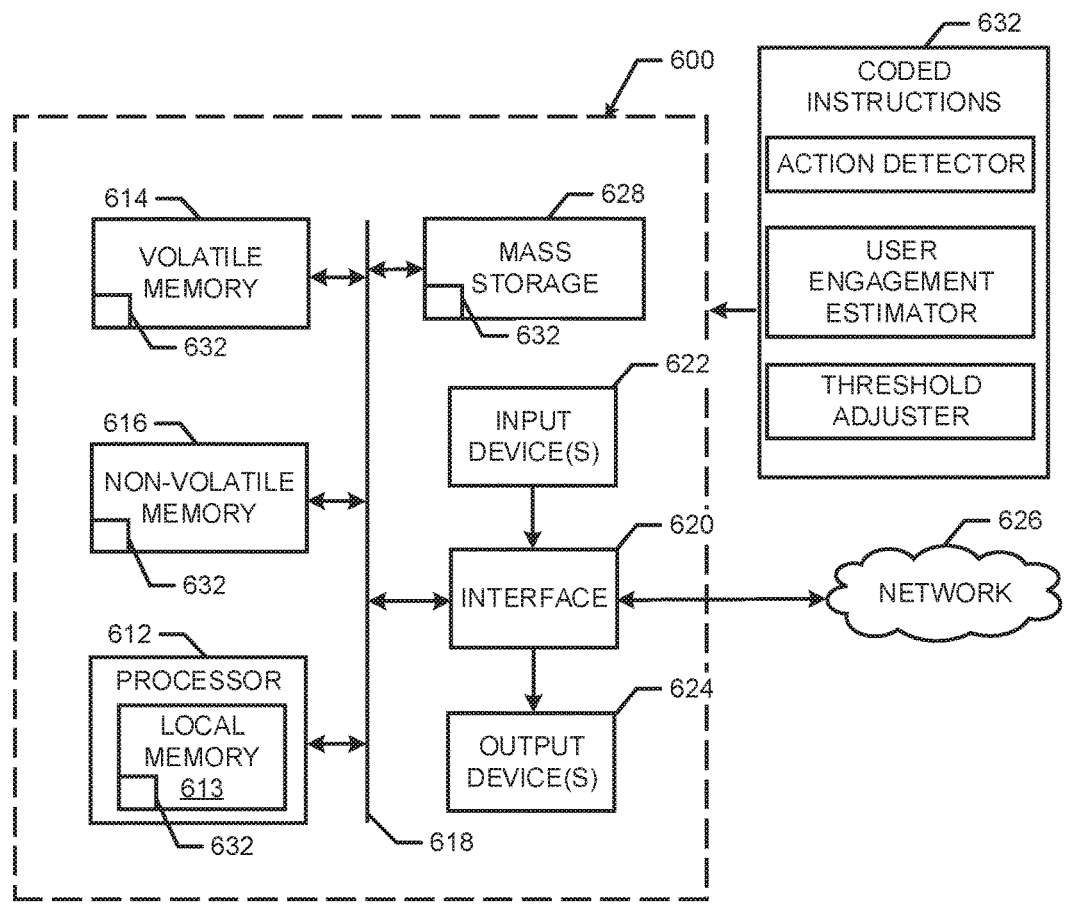
FIG. 6 is a block diagram of an example processor platform capable of executing the instructions of FIGS. 3, 4, and/or 5 to implement the user engagement monitor of FIG. 2.

FIG. 6 is a block diagram of an example processor platform 600 capable of executing the instructions of FIGS. 3, 4, and/or 5 to implement the user engagement monitor 112 of FIG. 2. The example processor platform 600 may be or may be included in any type of apparatus, such as a server, a personal computer, a mobile device (e.g., a cell phone, a smart phone, a tablet, etc.), a personal digital assistant (FDA), an Internet appliance, or any other type of computing device.

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory, a persistent, byte-addressable memory accessible via a memory fabric and/or any other desired type of non-volatile memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, and/or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes at least one mass storage device 628 for storing executable instructions (e.g., software) and/or data. Examples of such mass storage device(s) 628 include floppy disk drives, hard drive disks, compact disk drives, Blu-ray disk drives, RAID systems, and digital versatile disk (DVD) drives.

The coded instructions 632 of FIGS. 3, 4, and 5 may be stored in the mass storage device 628, in the local memory 613 in the volatile memory 614, in the non-volatile memory 616, and/or on a removable tangible machine readable storage medium such as a CD or DVD.

The above disclosed methods, apparatus and articles of manufacture may measure performance of an application by adjusting thresholds based on user engagement of the application in response to activation of action items. Accordingly, in examples herein, thresholds for reporting whether an action item achieves an acceptable performance when activated may be dynamically adjusted based on an estimated user engagement of the application in response to the activation of the action item. As such, applications may be accurately measured as providing acceptable or unacceptable performance based on a user experience of the application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for measuring performance of an action item of an application, the method comprising:
   detecting an activation of the action item of the application;
   measuring a degree of user engagement of the application in response to the activation of the action item and based on an amount of data retrieved for the application in response to the activation of the action item, wherein a measurement of the amount of data retrieved for the application in response to the action item being activated and a length of time between the action item being activated and a user activating a subsequent action item of the application are each assigned a weight value in the measuring the degree of user engagement;
   adjusting a threshold time for acceptable performance for the action item based on the amount of data retrieved for the application in response to the activation of the action item; and
   reporting that the action item achieved the acceptable performance when the length of time satisfies the threshold time and when a time to retrieve the amount of data retrieved for the application in response to the action item being activated satisfies the threshold time.

2. The method of claim 1, further comprising:
   measuring a user action time from a first moment the activation of the action item is detected to a second moment the subsequent activation of the subsequent action item is detected.

3. The method of claim 1, further comprising:
   reporting that the action item achieved the acceptable performance when a user action time satisfies the threshold time.

4. The method of claim 1, further comprising:
   determining the amount of data retrieved for the application by identifying an amount of network data downloaded from a network for the application in response to the activation of the action item.

5. The method of claim 1, further comprising:
   receiving a selection for measuring the degree of user engagement based on a user action time.

6. A non-transitory machine readable storage medium comprising instructions that, when executed, cause a machine to at least:
   detect an activation of an action item of an application;
   determine a degree of user engagement of the application in response to the activation of the action item based on an amount of data retrieved for the application in response to the activation of the action item, wherein a measurement of the amount of data retrieved for the application in response to the action item being activated and a length of time between the action item being activated and a user activating a subsequent action item of the application are each assigned a weight value in the determining the degree of user engagement;
   adjust a threshold time for acceptable performance of the action item based on the amount of data retrieved for the application in response to the activation of the action item; and
   report that the action item achieved the acceptable performance when the length of time satisfies the threshold time and when a time to retrieve the amount of data retrieved for the application in response to the action item being activated satisfies the threshold time.

7. The non-transitory machine readable storage medium of claim 6, wherein the instructions, when executed, cause the machine to:
indicate that the action item achieved the acceptable performance when an execution time of a transaction of the action item satisfies the threshold time.

8. The non-transitory machine readable storage medium of claim 6, wherein the instructions, when executed, cause the machine to:
indicate that the action item achieved the acceptable performance when an execution time for the action item satisfies the threshold time.

9. An apparatus comprising:
a processor; and
a non-transitory computer readable medium storing machine readable instructions, wherein the processor executes the machine readable instructions to:
detect an activation of an action item of an application;
estimate a degree of user engagement of the application in response to the activation of the action item, the degree of user engagement based on a user action time after the activation of the action item and an amount of data retrieved for the application in response to the activation of the action item, wherein a measurement of the amount of data retrieved for the application in response to the action item being activated and a length of time between the action item being activated and a user activating a subsequent action item of the application are each assigned a weight value in the estimating the degree of user engagement;
adjust a threshold time for acceptable performance of the action item based on the degree of user engagement, wherein the degree of user engagement is based on the amount of data retrieved for the application in response to the activation of the action item; and
report that the action item achieved the acceptable performance when the length of time satisfies the threshold time and when a time to retrieve the amount of data retrieved for the application in response to the action item being activated satisfies the threshold time.

10. The apparatus of claim 9, wherein the processor executes the machine readable instructions to:
indicate the acceptable performance of the action item when an execution time of the action item satisfies the threshold time.

11. The apparatus of claim 9, wherein the action item comprises a user selectable item that initiates a query to a network, wherein the degree of user engagement corresponds to the user accessing results of the query retrieved from the network by the application.

12. The apparatus of claim 9, wherein the amount of data retrieved for the application in response to the activation of the action item comprises an amount of transaction data to complete a transaction of the action item.

* * * * *